Patented Apr. 10, 1951

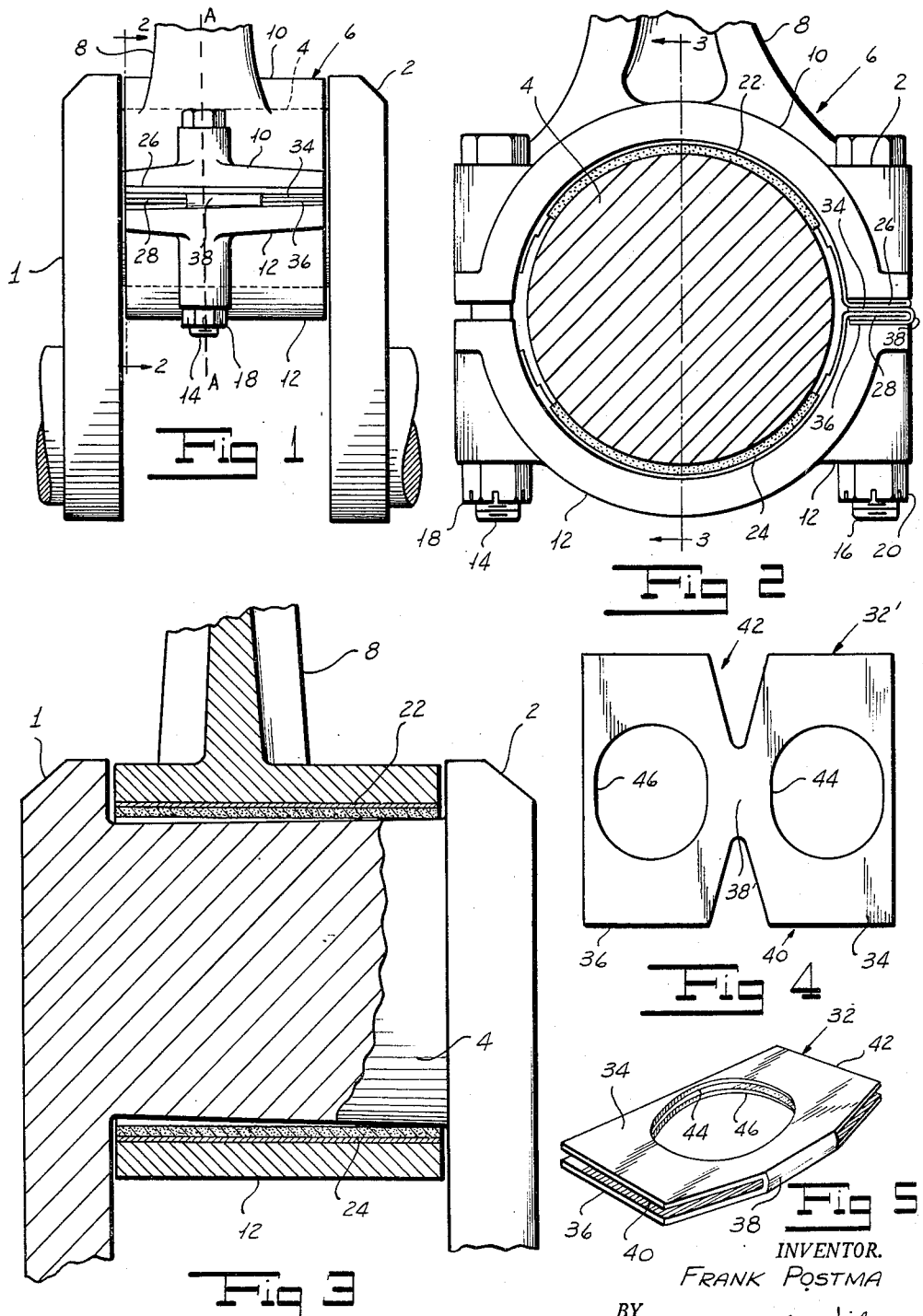

2,548,445

UNITED STATES PATENT OFFICE 2,548,445

ABRADING DEVICE

Frank Postma, Paterson, N. J.

Application February 24, 1949, Serial No. 78,055

7 Claims. (Cl. 51—204)

This invention relates to devices for abrading and thereby truing worn crankshafts for internal combustion engines and the like, without removing the crankshaft from the engine. More particularly the invention relates to an improved assembly employing as elements thereof abrading liners, of the type adapted to be substituted for the bearing liners of the engine connecting rod preferably disclosed in my U. S. Letters Patents No. 2,167,312, dated July 25, 1939, and No. 2,245,820, dated June 17, 1941, whereby the crank pin is not only restored to a condition in which transverse sections are perfectly circular but is altered throughout its length to restore it to cylindrical shape.

The abrading device of the present invention displays particular advantages in reshaping by abrading of crankshaft journals such as those of crank pins which have developed a conical shape due to wear. A typical example of such type of wearing of crank pins is found in automotive engines in which the connecting rods are offset from the center line of the piston thrust. The purpose of such offset is to permit a reduction of engine length. In the now commonly used type of six-cylinder engines for example, four main bearings are provided for the crank shaft, the main bearings being equally spaced so that two throws of the crank are positioned between each pair of main bearings Between the throws of of each of such pairs no space is required for a main bearing, and this is taken advantage of by extending the connecting rod bearing surfaces of each rod of each pair toward the other. Although such practice results in a compact design, it has the disadvantage that the greatest connecting rod bearing and crank pin wear takes place at points adjoining the main bearings, because of the offset between the center of thrust of the piston rod and its crank pin bearing. When an engine of this type has been run for a considerable length of time, the crank pins are found to have been worn to a frusto-conical shape, the portion of the crank pin in line with the center of thrust of the piston rod being noticeably smaller than that portion of the crank pin contacted by the offset portion of the piston rod bearing.

It is an object of the invention to provide an improved abrading device including abrasive liners of the type disclosed and claimed in my prior patents set out above which will not only restore the crank pin to a perfect round but will also remove the taper therefrom.

This and further objects of the invention will become more readily apparent in the following description of a preferred embodiment thereof.

Briefly, the abrading device of the invention consists of the combination with a removable abrading liner of the type generally described in my prior patents of a tapered shim, hereafter termed a "supplementary shim," interfitting with the integral shim or flange on the outer edge of such liner, whereby the bearing cap of the piston rod with the abrasive liner in place is rocked or tipped in the desired direction and to the required degree to remove the taper from the crank pin upon running the crank shaft and thus abrading the pin for the requisite length of time.

The invention will be more readily understood by reference to the accompanying drawing showing the described preferred embodiment of the invention, in which:

Fig. 1 is a view in side elevation of a portion of a crank shaft showing a crank pin with the abrading assembly of the invention in position thereabout;

Fig. 2 is a view of the crank shaft and abrading assembly shown in Fig. 1, such view being partially in elevation and partially in section, the section being taken along the line 2—2 in Fig. 1;

Fig. 3 is a view partially in side elevation and partially in vertical section through such assembly, the section being taken along the line 3—3 in Fig. 2;

Fig. 4 is a view in plan of a tapered supplementary shim in blanked out, flat, form; and Fig. 5 is a view in perspective of such supplementary shim.

In Figs. 1 and 2 there is shown a portion of a crankshaft 2 of a conventional six-cylinder automotive engine, such portion including the crank pin 4. Such crank pin cooperates with the crank pin bearing, generally designated at 6, on the lower end of the piston rod 8. Such piston rod is of the offset type previously described, the center line of the piston thrust lying along the vertical dotted line A—A. The crank pin bearing 6 is split, in accordance with usual construction, the upper half 10 of such bearing being integral with the lower end of the piston rod 8 and the lower half of the bearing being in the form of a removable cap 12. The bearing is retained on the crank pin by means of the vertical bolts 14 and 16 which extend through bosses integral with the upper and lower bearing halves, the bolts being provided with the castellated nuts 18 and 20 located on bolts 14 and 16, respectively.

In the assembly shown in Figs. 1, 2, and 3, the usual thin bearing liners within the upper and lower halves of the bearing 6 have been replaced by a pair of abrading liners such as described and claimed in my Patent No. 2,245,820, both the abrading liners, that in the upper bearing half being designated 22, and that in the lower bearing half being designated 24, being so mounted that their integral shims extend toward the front in Figure 1 and to the right in Figure 2. Such integral shim on the upper abrading liner 22 is designated 26, and that on the lower abrading device 24 is denoted 28. Each of such integral shims is provided with an elongated slot to allow the passage of bolt 16 therethrough. In the preferred embodiment employing the abrading liners shown in Patent No. 2,245,820, the other end of each of the liners is devoid of a shim, as shown.

Because of the offset of the center line of piston thrust A—A, from the longitudinal center of the crank pin, as clearly evident in Figure 1, the wear upon the left hand end of the crank pin in Figure 1 is much more severe than that upon the right hand end of such pin. Thus, after an extended period of use, not only does the crank pin become out-of-round because of the periodical nature of the load imposed upon it, but it also tends to assume a frusto-conical shape with the apex of the cone lying to the left in Figure 1.

In accordance with the invention there is provided on at least one of the integral shims 26 and 28 of the abrading liners a laterally tapered supplementary shim 32 of U shape, as shown in Figure 5, formed so that the spaced parallel leaves 34 and 36 thereof, which are preferably of a size and shape corresponding to the size and shape of the integral shims 26 and 28, tightly embrace and overlie the faces of the integral shim so as to be securely retained thereon in the desired position, and positioned so that the bight 38 of the shim 32 engages the outer edge of integral shim 28. Preferably the supplementary shim is made of half-hard carbon steel, a typical supplementary shim for use with abrading liners on the ordinary automobile engine being bent up from stock which is .005" in thickness on edge 40, tapering uniformly therefrom to .002" at the opposite edge 42.

As shown in Figures 1 and 3, the supplementary shim is placed on the integral shim of the bottom abrading liner. The supplementary shim is so placed that the thicker edge 40 of its leaves 34 and 36 lies at that end of the crank pin which is worn to the smaller diameter. Such end of the crank pin is naturally that which is closer to the center line of piston thrust. With the abrading liners and the supplementary shim in place, as shown, the nut 20 on bolt 16, such bolt extending through the slots in the integral shims of the abrading liners and through the similarly shaped holes 44 and 46 in leaves 34 and 36, respectively, of the supplementary shim, is tightened to draw the outer edges of the bearing halves on that side of the crank pin tightly into contact with the integral shims and with the leaves of the supplementary shim. The presence of the supplementary shim causes the lower bearing half or cap to tilt, as shown in Figures 1 and 3, so that the lower abrading liner contacts the left-hand end of the crank pin only lightly if at all, whereas the right-hand end of such lower abrading liner contacts the right-hand end of the crank pin with appreciable force. Thus, upon rotation of the crank shaft as by use of the automobile starting motor, the right-hand end of the crank pin which, as explained, is of larger diameter, is gradually ground down. The feeding of the abrading liners in a direction toward the axis of the crank pin is effected by intermittent tightening of nut 18 on bolt 14.

In some cases it will be desirable, particularly when the crank pin is worn frusto-conical to a relatively large degree, to start the above described pin truing operation with a first supplementary shim in place in the assembly, such first shim having a relatively high degree of taper, e. g. from .005" on one side to .001" on the other side of the leaves, in the initial stage of the operation. After use of such first shim for an appreciable time it is removed and a shim having a taper such as .005" to .002", from side to side is substituted therefor, the grinding operation being continued until the crank pin has been brought to a truly cylindrical shape.

When such shape is reached, nuts 18 and 20 are loosened, the supplementary shim 32 is removed, and the crank pin is given one or more finishing grinding operations with the same abrading liners or with abrading liners carrying finer grit therein to insure the final correction of the out-of-roundness of the crank pin and to provide it with the desired fineness of finish.

The supplementary shim is, as indicated, preferably blanked out of stock uniformly tapered from edge to edge. Such blank is shown in Figure 4. The two leaves 34 and 36 are then bent toward each other, about the connecting portion designated 38' in the blank, so that the leaves lie parallel to each other and spaced apart a distance approximately equal to the integral shim 28, which the shim 32 is designed to embrace.

The use of the tapered shim produces a grinding assembly, consisting of the bearing halves, the abrading liners, the tapered shim, and the bolts for holding the bearing halves together, which is accurate in contour. Thus the leaves of the supplementary tapered shim back up the integral shim on the abrading liner, to which the tapered shim is affixed, over the entire width of the integral shim, and thus prevents distortion of such integral shim and of the portion of the semi-cylindrical abrading liner half adjacent thereto, across the entire width thereof.

In practice, one of the side edges of one of the leaves of the supplementary shim, for example, the thicker edge, will be marked distinctively, as by color, so that the mechanic will readily know that such side of the shim should be assembled adjacent the smaller end of the tapered crank pin. Since two or more tapered supplementary shims of different tapers may sometimes be required to be used sequentially, as above indicated, it is convenient to mark the shims designed for a particular engine not by the amount of the taper of the shim but by the amount of crank pin taper, for example, .003" or .005", which each particular shim is designed to reduce or remove.

This application is a continuation-in-part of application Serial No. 733,066, filed March 7, 1947, now abandoned.

Although I have described and illustrated a preferred embodiment of the improved abrading assembly of my invention, it will be understood that the invention is capable of considerable variation as to details and that the invention is therefore to be defined by the following claims.

I claim as new the following:

1. As a new article of manufacture, abrading liners for engine crankshaft bearings formed in separable halves and having means for holding such halves together, consisting of the combination with a pair of arcuate shells of relatively thin flexible sheet material adapted to seat against the bore in the respective halves of the bearing, said shells being provided inwardly thereof with abrasive material for engagement with the crank journal at the bearing, said shells having shims integral with corresponding ends thereof adapted to fit between the edges of the bearing halves on one side thereof, of at least one supplementary shim having a leaf located between the integral shims of the two abrading liner shells, said leaf of the supplementary shim covering the confronting faces of the integral shims over substantially their entire extent, said leaf tapering uniformly in thickness from one side edge of the leaf to the other, whereby the inner abrasive surface of the liners assumes a frusto-conical shape when the bearing halves are tightened toward each other.

2. As a new article of manufacture, abrading liners for engine crankshaft bearings formed in separable halves and having means for holding such halves together, consisting of the combination with a pair of arcuate shells of relatively thin flexible sheet material adapted to seat against the bore in the respective halves of the bearing, said shells being provided inwardly thereof with abrasive material for engagement with the crank journal at the bearing, said shells having shims integral with corresponding ends thereof adapted to fit between the edges of the bearing halves on one side thereof, of at least one supplementary shim of U shape, the supplementary shim having spaced parallel leaves of a size and shape approximating the size and shape of the integral shims, the supplementary shim being affixed to one of the integral shims by having its two leaves located on opposite sides of said integral shim, the two leaves tapering uniformly in thickness in the same direction from one side edge of the shim to the other, whereby the inner abrasive surface of the liners assumes a frusto-conical shape when the bearing halves are tightened toward each other.

3. As a new article of manufacture, abrading liners for engine crankshaft bearings formed in separable halves and having means for holding such halves together, consisting of the combination with a pair of similar arcuate shells of relatively thin flexible sheet material adapted to seat against the bore in the respective halves of the bearing, said shells being provided inwardly thereof with abrasive material for engagement with the crank journal at the bearing, said shells having similar shims integral with corresponding ends thereof adapted to fit between the edges of the bearing halves on one side thereof, of at least one supplementary shim of U shape, the two leaves of the supplementary shim being parallel and of approximately the same shape and size as the integral shims, a first leaf of the supplementary shim being located between the integral shims of the two abrading liner shells, the supplementary shim being affixed to a first one of the integral shims by having its two leaves located on and frictionally engaging opposite sides of said first integral shim, so that the supplementary shim is retained thereon during manipulation of the first abrading liner, the second leaf of the supplementary shim being located between the first one of the integral shims and the edge of the bearing half confronting said first integral shim, the leaves of the supplementary shim substantially completely overlying the first one of the integral shims, the two leaves tapering uniformly in thickness in the same direction from one side edge of the shim to the other, whereby the inner abrasive surface of the liners assumes a frusto-conical shape when the bearing halves are tightened toward each other.

4. As a new article of manufacture, abrading liners for engine crankshaft bearings formed in separable halves and having means for holding such halves together, consisting of the combination with a pair of similar arcuate shells of relatively thin flexible sheet material adapted to seat against the bore in the respective halves of the bearing, said shells being provided inwardly thereof with abrasive material for engagement with the crank journal at the bearing, each of said shells having at one end of each a similar shim integral with the corresponding end thereof adapted to fit between the edges of the bearing halves on one side thereof, the other end of each of the abrading liner shells being devoid of such integral shim whereby the edges of the bearing halves at such other end directly confront each other, of a supplementary shim of U shape, the two leaves of the supplementary shim being parallel and of approximately the same shape and size as the integral shims, a first leaf of the supplementary shim being located between the integral shims of the two abrading liner shells, the supplementary shim being affixed to a first one of the integral shims by having its two leaves located on and frictionally engaging opposite sides of said first integral shim, so that the supplementary shim is retained during manipulation of the first abrading liner, the second leaf of the supplementary shim being located between the first one of the integral shims and the edge of the bearing half confronting said first integral shim, the leaves of the supplemental shim substantially completely overlying the first one of the integral shims, the two leaves tapering uniformly in thickness in the same direction from one side edge of the shim to the other, whereby the inner abrasive surface of the liners assumes a frusto-conical shape when the bearing halves are tightened toward each other.

5. As a new article of manufacture, abrading liners for engine crankshaft bearings formed in separable halves and having a bolt at each side thereof extending through the edges of the halves for holding such halves together, consisting of the combination with a pair of similar arcuate shells of relatively thin flexible sheet material adapted to seat against the bore in the respective halves of the bearing, said shells being provided inwardly thereof with abrasive material for engagement with the crank journal at the bearing, each of said shells having at one end of each a similar shim integral with the corresponding end thereof adapted to fit between the edges of the bearing halves on one side thereof, the bearing half securing bolt at such side side extending through the integral shims, the other end of each of the abrading liner shells being devoid of such integral shim whereby the edges of the bearing halves at such other end directly confront each other, of a supplementary shim of U shape, the two leaves of the supplementary shim being parallel and of approximately the same shape and size as the integral shims, a first leaf of the supplementary shim being located between the integral shims of the two abrading liner shells, the supplmentary shim being affixed to a first one of the integral shims by having its two leaves located on and frictionally engaging opposite sides of said first integral shim, so that the supplementary shim is retained during manipulation of the first abrading liner, the second leaf of the supplementary shim being located between the first one of the integral shims and the edge of the bearing half confronting said first integral shim, the leaves of the supplemental shim substantially completely overlying the first one of the integral shims, the leaves of the supplementary shim having aligned openings therein through which extends the bolt which passes through the integral shims, the two leaves tapering uniformly in thickness in the same direction from one side edge of the shim to the other, whereby the inner abrasive surface of the liners assumes a frusto-conical shape when the bearing halves are tightened toward each other by the bolt passing through the integral shims and the leaves of the supplementary shim.

6. As a new article of manufacture, abrading liners for engine crankshaft bearings formed in separable halves and having means for holding such halves together, consisting of the combination with a pair of arcuate shells of relatively thin flexible sheet material adapted to seat against the bore in the respective halves of the bearing, said shells being provided inwardly thereof with abrasive material for engagement with the crank journal at the bearing, said shells having shims integral with corresponding halves on one side thereof, of at least one supplementary shim having a leaf located between the integral shims of the two abrading liner shells, said leaf of the supplementary shim having a width which is at least a substantial part of the width of the confronting faces of the integral shims, said leaf tapering uniformly in thickness from one side edge of the leaf to the other, whereby the inner abrasive surface of the liners assumes a conical shape when the bearing halves are tightened toward each other.

7. As a new article of manufacture, abrading liners for engine crankshaft bearings formed in separable halves and having means for holding such halves together, consisting of the combination with a pair of arcuate shells of relatively thin flexible sheet material adapted to seat against the bore in the respective halves of the bearing, said shells being provided inwardly thereof with abrasive material for engagement with the crank journal at the bearing, said shells having shims integral with corresponding ends thereof adapted to fit between the edges of the bearing halves on one side thereof, of at least one supplementary shim having a leaf located between the integral shims of the two abrading liner shells, said leaf of the supplementary shim having a width which is substantially the same as the width of the confronting faces of the integral shims, said leaf tapering uniformly in thickness from one side edge of the leaf to the other, whereby the inner abrasive surface of the liners assumes a conical shape when the bearing halves are tightened toward each other.

FRANK POSTMA.

REFERENCES CITED

The following references are of record in the file of this patent:

UNITED STATES PATENTS

| Number | Name | Date |
| --- | --- | --- |
| 1,346,036 | Lovelace | July 6, 1920 |
| 2,245,820 | Postma | June 17, 1941 |